Patented Feb. 15, 1949

2,461,953

UNITED STATES PATENT OFFICE 2,461,953

COMPOUNDING COPOLYMERS OF BUTADIENE AND STYRENE

Ernest G. Bargmeyer, Mishawaka, Ind., assignor to United States Rubber Company, New York, N. Y., a corporation of New Jersey No Drawing. Application April 20, 1944, Serial No. 531,989

5 Claims. (Cl. 260—79.5)

This invention relates to improvements in preparing vulcanizates of butadiene-styrene copolymer elastomers or synthetic rubbers which are known generally under the name of Buna S or GRS. Buna S is generally prepared with a predominant amount of butadiene-1,3 and a minor amount of styrene (U. S. Patent No. 1,938,731), the best known preparation being about 75% butadiene-1,3 and 25% styrene, although it is recognized that greater or lesser amounts of styrene may be used, depending upon the purpose for which the material is used.

An object of the invention is to produce Buna S vulcanizates of reasonably good tensile and abrasion properties without the need of having a reinforcing carbon black. Good tensile and abrasion are difficult of attainment without recourse to the use of suitable proportions of carbon black. Hence the art has had to rely on black pigmented Buna S stocks to obtain stocks having good tensile and abrasion. By this invention it is possible to produce non-black Buna S rubber products of good tensile and abrasion. Other objects will be apparent from the following description.

The conventional practice in making black pigmented GRS stocks is shown on page 20 of the India Rubber World (New York) of October, 1943, wherein the full amount of sulfur is afterwards added on the sheeting mill.

I have discovered that if non-conventionally, a fraction (usually less than 0.5 part based on the GRS) of the total amount of sulfur which is predetermined for an optimum cure, is compounded and thoroughly dispersed in the Buna S, after it is properly broken down on the mill, along with or without the usual amounts of zinc oxide, accelerator, modifying agents such as softeners—non-black pigments or loading agents, and antioxidant—and the mix given a special preliminary heat treatment on the mill, in air, open steam, or by mixtures of air and steam, for a time sufficient to give the Buna S a slight precure—that the resulting stock containing some combined sulfur, after the incorporation and dispersal of the additionally required sulfur and other desired ingredients following such preliminary heat treatment—can be mold-cured to provide a Buna S vulcanizate having tensile and abrasion properties comparable to that obtainable with a carbon black reinforced stock. Tensiles up to 1200 pounds per square inch and abrasion resistance up to 100% have been obtained on the United States Rubber Company abrasion machine, compared with a standard test piece rated arbitrarily at 100%.

The following examples are given to illustrate the invention, the parts being by weight:

| Compound | A | B |
|---|---|---|
| GRS [1] | 100 | 100 |
| Tetramethyl thiuram monosulfide (accelerator) | 0.42 | 0.42 |
| Softener [2] | 10 | 10 |
| Condensation product of diphenylamine and acetone (antioxidant) | 2 | 2 |
| Fine particle size whiting | 100 | 100 |
| Zinc oxide | 10 | 10 |
| Sulfur | 0.25 | 2 |
| Heat treatment 4 hrs. at 260° F | Yes | No |
| Sulfur after heat treatment | 1.75 | |

[1] Butadiene-styrene (65:35) prepared with rosin soap as emulsifying agent; Mooney Viscosity=70.
[2] A long-chain unsaturated hydrocarbon refined from petroleum, of high molecular weight and B. P. above 320° F.

| Cure at 40 lbs. per sq. in. steam pressure in minutes | A | | B | |
|---|---|---|---|---|
| | Tensile | Percent Elong. | Tensile | Percent Elong. |
| 15 | 1,480 | 810 | 176 | 710 |
| 20 | 1,330 | 810 | 775 | 930 |
| 30 | 1,560 | 800 | 1,310 | 720 |
| 45 | 1,705 | 690 | 1,213 | 718 |

*Abrasion Resistance—U. S. Rubber Co. Abrader*

| | A | B |
|---|---|---|
| Cure at 65 lbs per sq. in. steam pressure in 20 minutes per cent | 96.5 | 86.5 |

Tensile strength figures are in pounds per square inch of original cross-section. Elongation is percentage of original length. Abrasion results are expressed as percentage of an arbitrary standard taken as 100%. The U. S. Rubber Co. Abrader is described in R. T. Vanderbilt Company's 1936 Rubber Handbook. Fine particle size whiting is mentioned here as the specific filler. However, various types of carbon black, clay, and other fillers may be also used with essentially similar results.

The amount of sulfur used in the preliminary heating may range from .15 to .35 parts, based on 100 parts by weight of the Buna S itself. The time of heating may vary with the temperature, and generally may range from 2 to 4 hours. Generally, the temperature of the preliminary heating ranges from 250° F. to 290° F.

Variation in procedure and proportion of ingredients desired for any particular stock, commensurate with finally desired properties, is permissible in accordance with the article by G. R.

Vila and F. L. Holbrook, page 37 et al., of the above-mentioned issue of the India Rubber World, without departing from the principle of the present invention.

Where aqueous dispersions are desired, the mass may be dispersed in water with the aid of suitable adjuvants, either directly, before, or after the addition of the required amount of further sulfur, prior to final cure. In such case, the final cure is best carried out on the deposits laid down from such a dispersion.

Having thus described my invention, what I claim and desire to protect by Letters Patent is:

1. A method which comprises heating an uncured butadiene-1,3-styrene copolymer rubber mix with a fraction of the amount of sulfur required to provide an optimum cure and for a time, sufficient to slightly cure the copolymer rubber and then masticating the mix containing the copolymer combined with sulfur to a plastic condition suitable for the addition of further sulfur sufficient to provide an optimum cure to a soft vulcanized state, and thereafter adding such additional sulfur, and vulcanizing to a soft vulanized state.

2. A method which comprises heating an uncured butadiene-1,3-styrene copolymer rubber mix with some but less than 0.5 part of sulfur, based on 100 parts by weight of the copolymer, said fraction being sufficient to give the copolymer a slight precure, and heating for a time, sufficient to slightly cure the copolymer rubber, and then masticating the mix containing the copolymer combined with sulfur to a plastic condition suitable for the addition of further sulfur sufficient to provide an optimum cure to a soft vulcanized state, and thereafter adding such additional sulfur, and vulcanizing to a soft vulcanized state.

3. A method of providing increased tensile and abrasion resistance in synthetic vulcanizates of a rubbery butadiene-1,3-styrene copolymer without the necessity of reinforcement with carbon black, which comprises incorporating and dispersing in the uncured copolymer rubber from about .15 to less than .5 part by weight of sulfur based on 100 parts by weight of the copolymer, heating at a temperature and for a time sufficient to substantially complete the chemical combination of the sulfur and the copolymer, subsequently adding additional sulfur sufficient to finally cure the rubber to a soft vulcanized state, and compounding ingredients, and finally curing the stock to a soft vulcanized state.

4. A method of providing increased tensile and abrasion resistance in synthetic vulcanizates of a rubbery butadiene-1,3-styrene copolymer without the necessity of reinforcement with carbon black, which comprises incorporating and dispersing in the uncured copolymer rubber from .15 to .35 part by weight of sulfur based on 100 parts by weight of the copolymer, heating at a temperature and for a time sufficient to substantially complete the chemical combination of the sulfur and the copolymer, subsequently adding additional sulfur sufficient to finally cure the rubber to a soft vulcanized state, and compounding ingredients, and finally curing the stock to a soft vulcanized state.

5. A method of providing increased tensile and abrasion resistance in soft vulcanized 1,3-butadiene-styrene copolymer rubbers without the necessity of reinforcement with carbon black, which comprises incorporating and dispersing in the uncured copolymer rubber but a portion of the predetermined required amount of sulfur effective to provide the said soft vulcanized copolymer rubber, said portion being less than 0.5 percent by weight (based on the copolymer rubber), heating the mix at a temperature and for a time sufficient to bring about a partial cure of the copolymer, subsequently mixing in the remainder of the said required amount of sulfur, and finally curing the stock to the soft vulcanized state.

ERNEST G. BARGMEYER.

REFERENCES CITED

The following references are of record in the file of this patent:

UNITED STATES PATENTS

| Number | Name | Date |
|---|---|---|
| 1,384,773 | Molony | July 19, 1921 |
| 2,397,774 | Buckley | Apr. 2, 1946 |